(12) United States Patent
Lee (10) Patent No.: US 6,876,790 B2
(45) Date of Patent: Apr. 5, 2005

(54) METHOD OF COUPLING A LASER SIGNAL TO AN OPTICAL CARRIER

(75) Inventor: Hyo Sang Lee, Silver Spring, MD (US)

(73) Assignee: Science & Engineering Services, Inc., Burtonvsville, MD (US)

(*) Notice: Subject to any disclaimer, the term of this patent is extended or adjusted under 35 U.S.C. 154(b) by 133 days.

(21) Appl. No.: 10/146,920

(22) Filed: May 17, 2002

(65) Prior Publication Data

US 2003/0215181 A1 Nov. 20, 2003

(51) Int. Cl.$^7$ .................................................. G02B 6/32
(52) U.S. Cl. ............................. 385/33; 385/74; 385/79; 385/93
(58) Field of Search ................................ 250/281, 282, 250/287, 288; 356/128; 315/507; 385/32, 33, 34, 35, 36, 74, 76, 79, 92, 93

(56) References Cited

U.S. PATENT DOCUMENTS

| | | | | |
|---|---|---|---|---|
| 4,421,383 A | * | 12/1983 | Carlsen ........................ | 385/79 |
| 4,475,788 A | * | 10/1984 | Tomassini et al. ............ | 385/32 |
| 4,705,351 A | * | 11/1987 | Toda ............................. | 385/74 |
| 4,732,448 A | * | 3/1988 | Goldenberg ................... | 385/33 |
| 4,929,045 A | * | 5/1990 | Fuller ........................... | 385/33 |
| 4,997,250 A | * | 3/1991 | Ortiz, Jr. ...................... | 385/33 |
| 4,998,794 A | * | 3/1991 | Holzman ...................... | 385/33 |
| 5,040,862 A | * | 8/1991 | Burton et al. ................. | 385/33 |
| 5,064,284 A | * | 11/1991 | Johnston et al. ............. | 356/121 |
| 5,123,723 A | * | 6/1992 | Chesnutt et al. .............. | 385/33 |
| 5,193,132 A | * | 3/1993 | Uken et al. .................... | 385/32 |
| 5,210,412 A | * | 5/1993 | Levis et al. .................. | 250/288 |
| 5,245,682 A | * | 9/1993 | Ortiz, Jr. ...................... | 385/33 |
| 5,347,604 A | * | 9/1994 | Go et al. ....................... | 385/92 |
| 5,396,325 A | * | 3/1995 | Carome et al. ............. | 356/128 |
| 5,511,140 A | * | 4/1996 | Cina et al. .................... | 385/93 |
| 5,631,991 A | * | 5/1997 | Cohen et al. | |
| 6,137,246 A | * | 10/2000 | Suzuki ........................ | 315/507 |
| 6,210,046 B1 | * | 4/2001 | Rogers et al. ................. | 385/74 |
| 6,238,102 B1 | * | 5/2001 | Ohtani et al. .................. | 385/78 |
| 6,263,132 B1 | * | 7/2001 | Shahid .......................... | 385/31 |
| 6,438,288 B1 | * | 8/2002 | Tehrani ........................ | 385/27 |
| 6,518,568 B1 | * | 2/2003 | Kovtoun et al. ............ | 250/287 |
| 6,587,618 B2 | * | 7/2003 | Raguin et al. ................ | 385/33 |
| 6,593,582 B2 | * | 7/2003 | Lee et al. ................ | 250/458.1 |
| 2003/0052268 A1 | * | 3/2003 | Doroshenko et al. ....... | 250/288 |
| 2003/0215181 A1 | * | 11/2003 | Lee .............................. | 385/33 |

OTHER PUBLICATIONS

Victor V. Laiko et al., Desorption/Ionization of Biomolecules from Aqueous Solutions at ATmospheric Pressure Using an Infrared Laser at 3 $\mu$m, J Am Soc Mass Spectron 2202, 13, pp. 354–361.

Victor V. Laiko et al., Short Communication, Desorption/Ionization of Biomolecules from Aqueous Solutions at Atmospheric Pressure Using an Infrared Laser at 3 $\mu$m,Blackburn Lane, Burtonsville, MD 20866, USA.

(Continued)

*Primary Examiner*—John R. Lee
*Assistant Examiner*—David A. Vanore
(74) *Attorney, Agent, or Firm*—Oblon, Spivak, McClelland, Maier & Neustadt, P.C.

(57) ABSTRACT

A method and apparatus for coupling a laser signal to an optical carrier. The method and associated apparatus control a power of the laser signal to a power density level below a damage threshold of the optical carrier, couple the laser signal to the optical carrier, and measure an output power of the laser signal at an exit of the optical carrier. By translating a focusing lens or an entrance of the optical carrier along an optical axis between the focusing lens and the entrance to the optical carrier, a range in measured power output is determined in which the laser signal is incident within the entrance of the optical carrier. The method and associated apparatus set a distance between the focusing lens and the entrance to the optical carrier such that the entrance to the optical carrier is at a position beyond a focal point of the focusing lens where the laser signal is divergent-coupled to the optical carrier.

40 Claims, 7 Drawing Sheets

OTHER PUBLICATIONS

Victor V. Laiko et al, Atmospheric Pressure Matrix–Assisted Laser Desorption/Ionization Mass Spectrometry, Analytical Chemistry, vol. 72, No. 4, Feb. 15, 2000, ANAL Chem. 2000, 72, pp. 652–657.

Coorg R. Prasad et al., Chemical and Biological Sensing II, Portable Digital Lidar—a Compact Stand–Off BioAgent Aerosol Sensor, Proceedings of SPIE vol. 4378 (2001), pp. 49–59.

Dirk Feldhaus et al., Influence of the Laser Fluence in Infrared Matrix–Assisted Laser Desorption/Ionization With a 2.94 $\mu$m Er: YAG Laser and a Flat–Top Beam Profile, Journal of Mass Spectrometry, J. Mass Spectrom, 35, pp. 1320–1328 (2000).

Ricky K. Nubling et al., Hollow–Waveguide Delivery Systems for High Power, Industrial $CO^2$ Lasers, Applied OPTICS, vol. 34, No. 3, Jan. 20, 1996, pp. 372–380.

F. Rainer et al., Laser Damage Thresholds at Short Wavelengths, Applied OPTICS vol. 21, No. 10, May 15, 1982, pp. 1722–1724.

Stefan Wuthrich et al., Optical Damage Thresholds at 2.94 $\mu$m in Fluoride Glass Fibers, Sep. 20, 1992 vol. 31, No. 27, Applied OPTICS pp. 5833–5837.

* cited by examiner

METHOD OF COUPLING A LASER SIGNAL TO AN OPTICAL CARRIER

BACKGROUND OF THE INVENTION

1. Field of Invention

The present invention relates to a process and apparatus for coupling laser pulses and other light beams into an optical carrier. The present invention enables convenient and cost-effective delivery of laser pulses and light signals via an optical carrier.

2. Discussion of the Background

In conventional applications of optical fiber, a continuous wave (CW) laser output is coupled into an optical fiber and propagated to a remote site. Optical damage to a fiber tip of the optical fiber by the laser output power is seldom a problem in many applications due to the relatively low power density input at the entry surface to the fiber tip. However, as the laser power density increases, for example in a pulse laser, the peak power density of the laser pulse can easily exceed a surface or bulk damage threshold of the fiber material. For a fiber material made of silica, the surface damage threshold ($\sim$100 MW/cm$^2$) as well as the bulk damage threshold ($\sim$200 MW/cm$^2$) can be exceeded. Previous work on optical damage using ultraviolet (UV) and infrared (IR) lasers has been described in F. Rainer et al., "Laser damage threshold at short wavelength," Applied Optics, Vol. 21, No. 10, pp. 1722–1724, May 1982, and in Wuthrich et al., "Optical Damage thresholds at 2.94 $\mu$m in fluoride glass fibers" Applied Optics, Vol. 31, No. 27, pp. 5833–5837, September 1992, the entire contents of which are incorporated herein by reference.

Figure 1A:
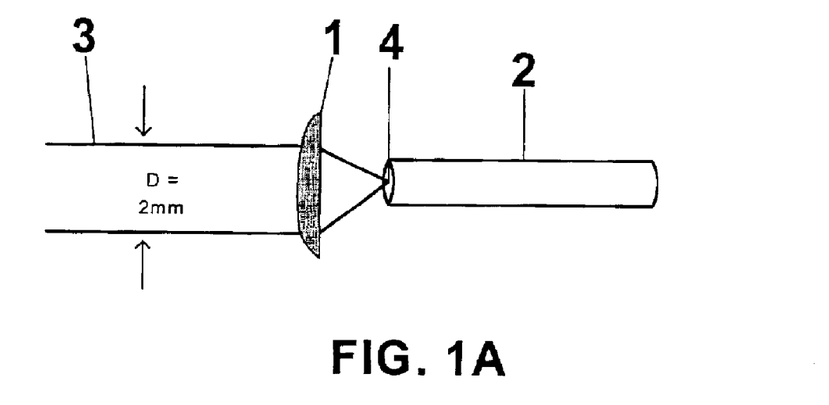
FIG. 1A is an exemplary schematic of a conventional convergent-coupling configuration in which light is focussed onto an end surface of a fiber optic.
Figure 1B:
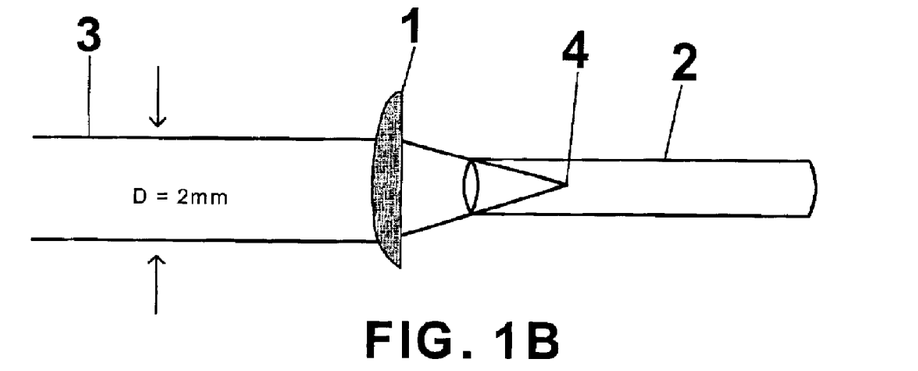
FIG. 1B is an exemplary schematic of a conventional convergent-coupling configuration in which light is focussed into the interior of a fiber optic.

FIG. 1A is an exemplary schematic of a convergent-coupling configuration conventionally used to couple, by a focussing lens 1, a laser beam 3 onto a focal spot 4 of an optical fiber 2. In the convergent-coupling geometry, power densities can exceed the damage thresholds of the optical carrier materials (e.g. optical fibers and waveguides). For example, the peak power density of a focussed YAG laser beam is about 26 GW/cm$^2$, considering the pulse energy of 10 $\mu$J, the 10 nsec pulse-width, and the diffraction limited spot diameter of $\sim$1 $\mu$m. This power density is far beyond the surface (or bulk) damage threshold of the silica in a conventional optical fiber. While the laser beam can be matched to an aperture and focussed, as shown in FIG. 1B, into the bulk of the optical fiber, the bulk material damage threshold is usually only a few times (e.g., 2–3 times) larger than the surface damage threshold, providing only a marginal increase in a safe power density margin. If beam alignment (or in this case misalignment) is such that an internal focus of the beam is on a wall of the optical carrier, then the intense power density will start to damage the optical carrier wall surface. Once initiated, the damage will gradually propagate to the center of the optical fiber. Thus, optical damage regardless of the point of focus in convergent-coupling is always a concern at the high power densities of pulse lasers.

Similar problems do occur in hollow-waveguides, as described by Nubling et al., "Hollow-waveguide delivery systems for high power, industrial lasers", Applied Optics, Vol. 34, No. 3, pp. 372–380, January 1996, the entire contents of which are incorporated herein by reference. While bulk damage in a hollow-waveguide is not a problem, in that the center of the hollow-waveguide is filled with air, the potential for damage on an internal surface of the hollow-waveguide due to misalignment of the laser beam is still a problem, similar to the afore-mentioned damage propagation problem.

SUMMARY OF THE INVENTION

One object of the present invention is to provide an optical coupling a laser beam onto an optical carrier without exceeding damage threshold levels of the material of the optical carrier.

Another object of the present invention is to provide an optical coupling which safely couples laser pulses into an optical carrier at powers which would normally exceed the damage threshold of the optical fiber in a conventional convergent-coupling configuration.

Another object of the present invention is to provide a method for coupling laser pulses, whose power densities at a diffraction limited spot size can exceed a bulk damage threshold of coupled fiber, into a small-aperture optical fiber without damaging the fiber and consequently delivering a laser pulse or a light signal over long distances along the fiber.

Yet another object of the present invention is to provide a method for high-power laser transmission from a laser source to an application point which may be located at a confined or remote place, not readily accessible. As such, the present invention has application to atmospheric pressure matrix assisted laser desorption ionization (MALDI), atmospheric pressure liquid assisted desorption and ionization (AP/LADI), and light detection and ranging (LIDAR) systems. In general, the present invention has application to any optical system utilizing lasers in which laser signals are transmitted or could advantageously be transmitted over a distance of the optical carrier to a remote application.

These and other objects of the present invention are achieved by a novel method and a novel apparatus for coupling a laser signal to an optical carrier. The method and associated apparatus controls a power of the laser signal to a power density below a damage threshold of the optical carrier, couple the laser signal onto the optical carrier, and measure an output power of the laser signal at an exit of the optical carrier. By translating a focusing lens or an entrance of the optical carrier along an optical axis between the focusing lens and the entrance to the optical carrier, a range in measured power output is determined in which the laser signal is incident within the entrance of the optical carrier. The method and associated apparatus set a distance between the focusing lens and the entrance to the optical carrier such that the entrance to the optical carrier is at a position beyond a focal point of the focusing lens where the laser signal is divergent-coupled to the optical carrier.

In different embodiments of the present invention, a MALDI, AP/LADI, or a LIDAR system includes an optical carrier configured to transmit a laser signal from a laser source to the respective systems, a focussing lens configured to couple the laser signal into the optical carrier, a power-density control device configured to control a power of the laser source to a power density level below a damage threshold of the optical carrier, a position-setting device configured to translate at least one of the focusing lens and an entrance of the optical carrier along an optical axis between the focusing lens and an entrance to the optical carrier, and configured to set a distance between the focusing lens and the entrance to the optical carrier such that the entrance to the optical carrier is at a position beyond a focal point of the focusing lens where the laser signal is divergent-coupled to the optical carrier and the laser signal is not incident on a periphery of the entrance to the optical light carrier. The power-density control device adjusts the power of the laser source to a level sufficient for operation of the respective systems without exceeding the damage threshold of the optical carrier material.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
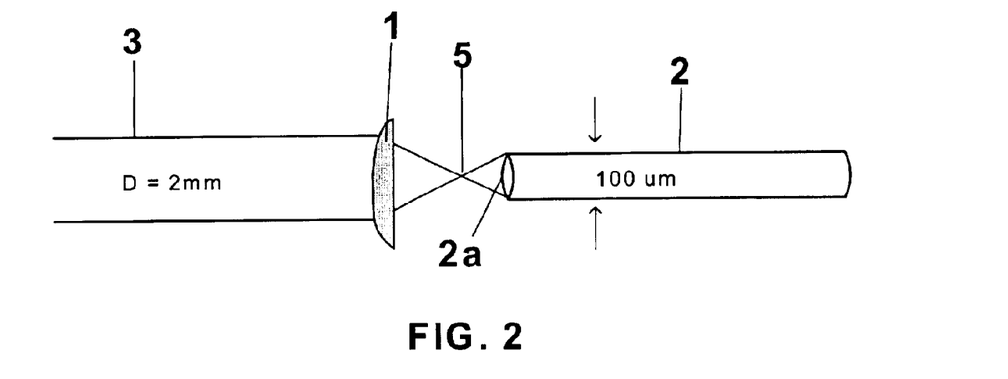
FIG. 2 is an exemplary schematic of a divergent-coupling configuration, according to the present invention.

Referring now to the drawings, wherein like reference numerals designate identical, or corresponding parts throughout the several views, and more particularly to FIG. 2 thereof, FIG. 2 is an exemplary schematic of a fiber optic coupling, according to the present invention, which does not require conventional convergent-coupling, thus maintaining a peak power density level below the surface or bulk damage threshold of the fiber optic. In the divergent-coupling configuration of the present invention, a laser beam 3 is incident on a focussing lens 1 and focussed to a focal point 5 in front of a fiber input surface 2a of a fiber 2. An aperture defined by the diameter of the fiber input surface 2a is matched to the fiber 2 at an expanding region of the laser beam after the laser beam focal point 5. In the coupling configuration of the present invention, the maximum peak power density of the laser beam entering the fiber 2 is defined by the aperture size of the fiber (e.g. 100 $\mu$m) rather than the diffraction-limited focal spot size (e.g. 1 $\mu$m). For example, the peak power density of the above mentioned laser matched, according to the present invention, at the fiber diameter of 100 $\mu$m aperture is 3.3 MW/cm$^2$, as compared to the peak power density of 26 GW/cm$^2$ for the convergent-coupling. The peak power density of 3.3 MW/cm$^2$ is well below the surface or bulk damage threshold of optical fibers. Thus, the laser pulse which would normally exceed the damage threshold of the optical fiber in a tight-focussing coupling configuration can be safely coupled to the optical fiber without incurring damage.

Furthermore, the coupling configuration of the present invention avoids having to focus the laser pulse inside the fiber volume, and thereby avoids bulk damage.

Figure 3A:
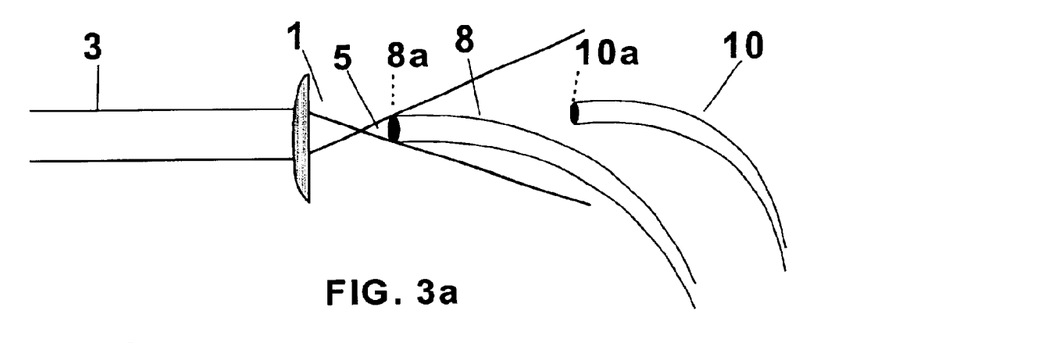
FIG. 3A is an exemplary schematic of an optical coupling, according to the present invention, in which a fiber is translated to vary the coupling efficiency.

FIG. 3A is an exemplary schematic of a fiber optic coupling, according to the present invention, in which a fiber is translated to vary the coupling efficiency. As shown in FIG. 3A, a laser beam 3 is focused by focusing lens 1 onto a focal point 5 which is in front of the end surface 8a of the optical fiber 8. As a result, the end surface 8a of optical fiber 8 and the end surface 10a of the optical fiber 10 subtend portions of the expanding laser beam, and thus are not subjected to a power density exceeding the critical damage threshold. As seen in FIG. 3A, the coupling efficiency at the fiber position of 10a is much smaller than that of the fiber position 8a.

Figure 3B:
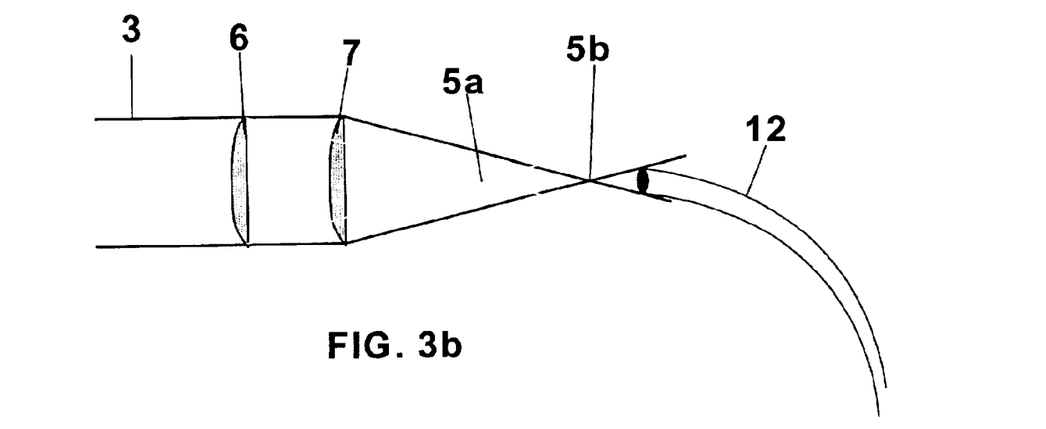
FIG. 3B is an exemplary schematic of an optical coupling, according to the present invention, in which a lens is translated to vary the coupling efficiency.

FIG. 3B is an exemplary schematic of an optical coupling, according to the present invention, in which a lens is translated to vary the coupling efficiency. As shown in FIG. 3B, a laser beam 3 is focused by a lens either at 5a or 5b position effectively varying the coupling efficiency of the fiber located at a fixed position.

Method of Laser Beam Alignment for Optimum Coupling

Optical alignment can assure that the beam is centered at an input end of the fiber and that the position of the fiber surface is positioned a proper distance away from the focal point of the lens.

In general, a short focal length is desired for minimum size as well as for a uniform distribution of the laser intensity inside of the fiber at any point along the length of the optical fiber. However, if the numerical aperture of the focusing lens 1 is larger than that of the optical fiber 2, the transmission efficiency of optical fiber 2 degrades. Thus, in a preferred embodiment the numerical aperture of the focusing lens 1 shown in FIG. 2 is matched to the numerical aperture of optical fiber 2. Since the laser can deliver, upon focus, power densities which far exceed the damage threshold of the fiber and deliver these high power densities at a point in space not far from the optical fiber, the alignment procedure of the present invention defines specific procedures for alignment. In the alignment procedure of the present invention, to be discussed thoroughly below, the input end 6a of the optical fiber 2 is positioned a proper distance away from the focal point 5 to ensure that the focussed power densities do not exceed the damage threshold of the fiber.

This procedure is especially preferred when the fiber is mounted to a commercial SMA fiber connector and an optical adhesive is exposed to the outside of the fiber cross section and/or when the metallic material of the SMA connector is exposed to the high power density of the laser pulse. In either case, the optical adhesive or the metallic material can be evaporated onto the input surface 6a of the optical fiber 2. In general, the threshold for evaporation of materials on the SMA connector or the optical adhesive is far lower than the damage threshold of the material of the transparent optical fiber (e.g. silica). Thus, alignment procedures are used to align the laser beam into the optical cross section of the input end 6a. Otherwise, contamination of the optical fiber and potential destruction of the SMA connector and the input surface of the fiber optic can occur, especially under high power coupling conditions.

Figure 4:
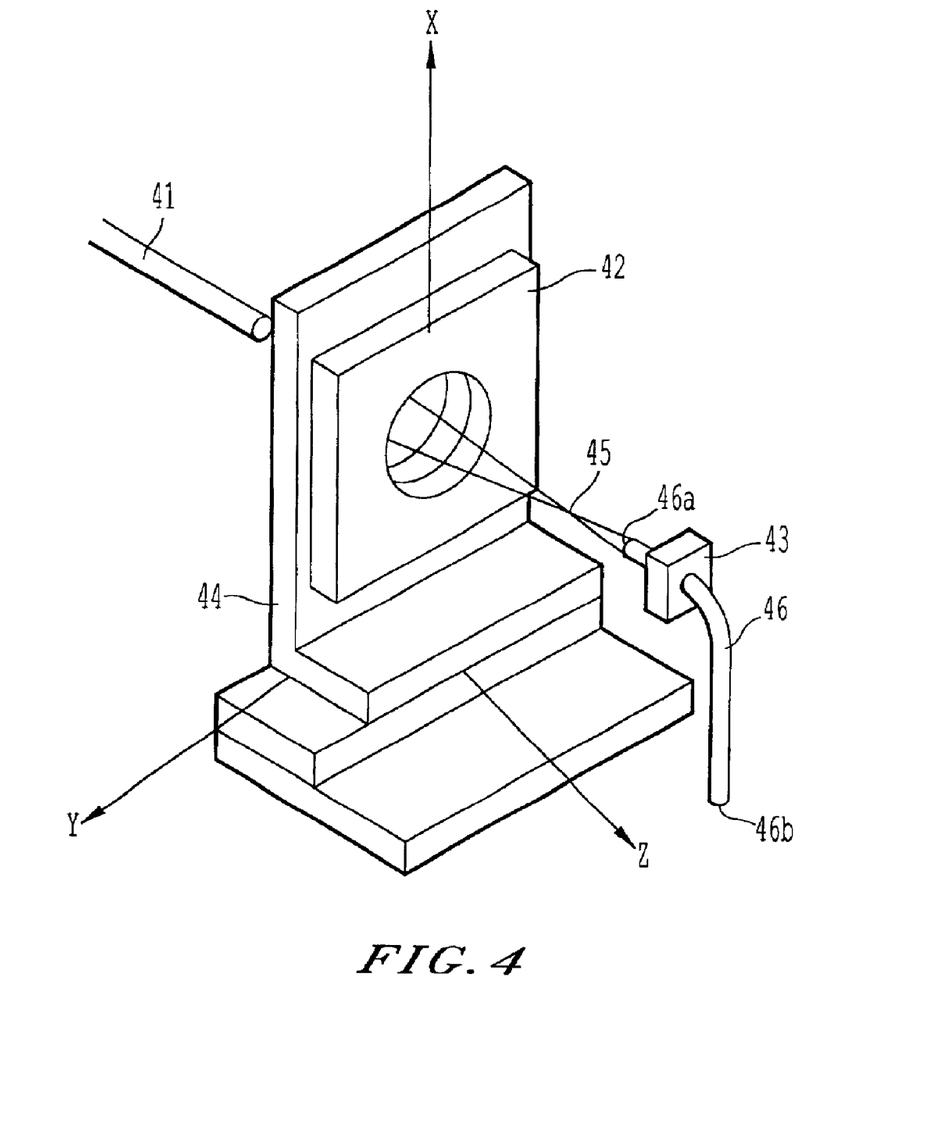
FIG. 4 is an exemplary diagram of a focusing device of the present invention.

FIG. 4 is an exemplary diagram of a focusing device of the present invention. The device described in FIG. 4 includes a focusing lens 42 mounted on an x-y-z translation stage 44. Alternatively, the optical fiber 46 shown in FIG. 4 can be mounted on the x-y-z translation stage 44. The device and methods for alignment are described below with reference to the flowchart in FIG. 5.

Figure 5:
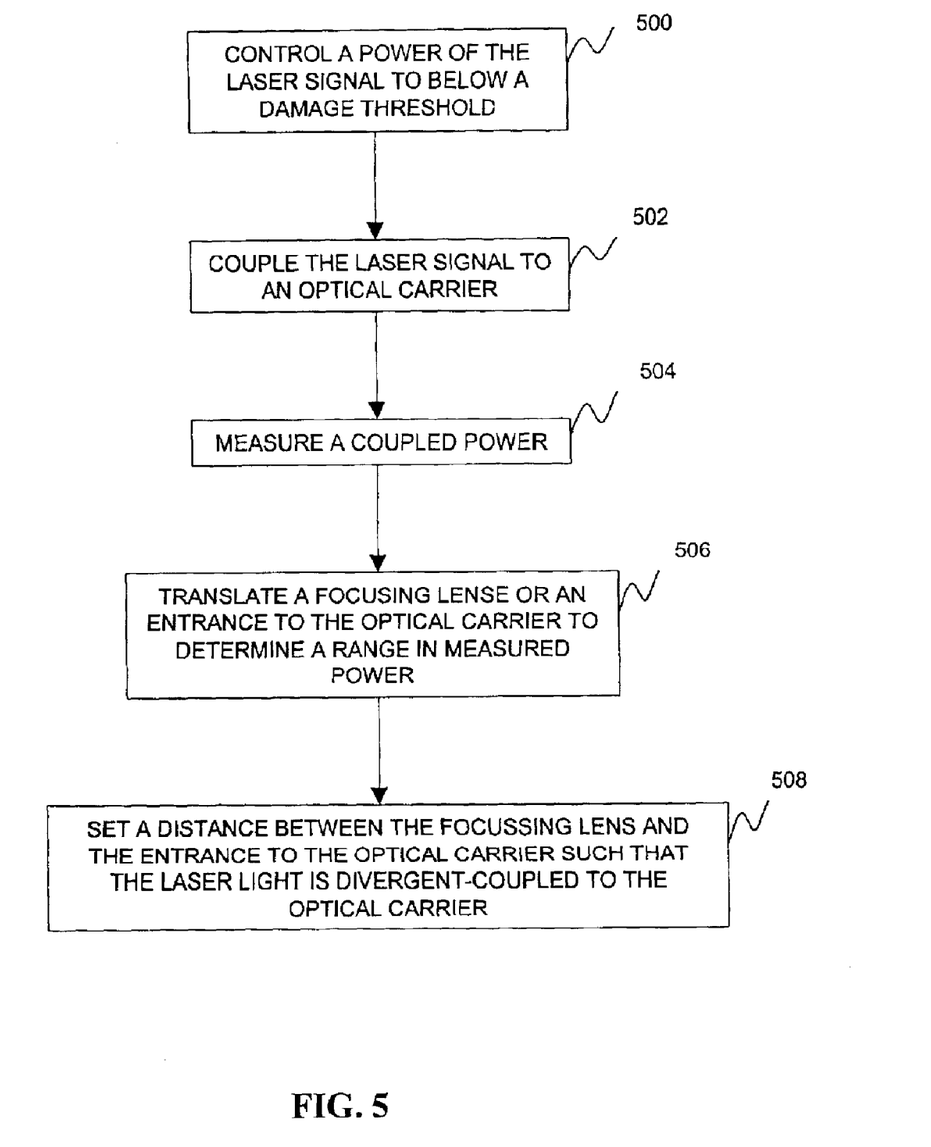
FIG. 5 is a flow chart depicting an alignment procedure according to the present invention.

In step 500, laser output power is reduced so that, even at the diffraction-limited focal point of the laser beam, the power density is below the damage threshold of the optical carrier (e.g the optical fiber 12) and below the evaporation threshold of the optical adhesive or the metallic material of the SMA connector. A power meter 43 is utilized to monitor the power in the optical carrier. Today, a majority of commercial optical fibers are rated for a maximum power density of ~100 MW/cm$^2$. However, application of the present invention is not limited to this maximum power density, but anticipates that improvements in fiber materials will allow even greater power densities to be coupled. A reduction in the laser output power can be achieved either by direct laser output power control or by inserting a neutral density filter into the laser beam path or by the power reduction methods described below.

In step 502, the laser signal 41 is coupled into the optical carrier (i.e. the optical fiber 46) by the focusing lens 42 mounted on the x-y-z translation stage 44.

In step 504, a power meter 43 inserted for example about the optical fiber 46 and determines an optimum x-y position of the focussing lens 42 by measuring a coupled power as the x-y-z translation stage 44 is translated. The power meter can include instruments such as for example a bullometer or a photodiode cell to determine the power being coupled into the fiber. An optimum position of the x-y position at a given z value is detected by a maximum output power on the power meter 52. The maximum output power and the position of the x-y-z translation stage 44 (and hence the position of the focussing lens) are recorded by a computer, microprocessor, or similar recording device known to those skilled in the art of data recording and processing.

In step 506, the x-y-z translation stage 44 is translated in a small step (e.g., in a step approximately 1/100 of the focal length of the lens) in the z direction. Step 504 is repeated to record the maximum output power at this position of the x-y-z translation stage 44. Step 506 is repeated as necessary to cover a range of z near and about the focal point.

Figure 6:
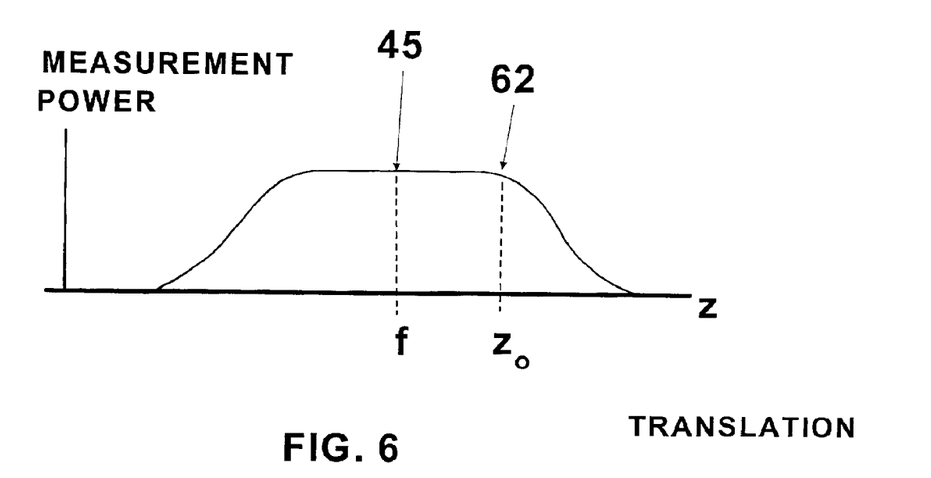
FIG. 6 is an exemplary diagram, according to the present invention, of a plot of laser power incident onto a fiber as a function of axial translation of the focal point.

The resulting power (P) measurement as a function of the z optical carrier determines a range or as illustrated in FIG. 6 a plateau where the laser signal is divergent-coupled to the optical carrier and is entirely incident on the entrance to the optical light carrier. For example, FIG. 6 is an exemplary diagram of a plot of measured power and the z-axis position. The plot shows that the power level is essentially constant on a plateau for a range of z about the focal point 45 as nearly all the laser beam is incident on the entrance 46a of the optical fiber 46. The ends of the plateau represent places where the divergence of the laser beam is such that a substantial portion of the laser beam is not incident on the input end of optical fiber and consequently not coupled into the optical fiber.

In step 508, the resulting power measurement as a function of z is analyzed to set a distance between the focussing lens and the entrance to the optical carrier to a position Zo (enumerated as 62 in FIG. 6) prior to the end of the plateau. The point Zo corresponds to a position where the laser beam diameter is slightly less than the fiber diameter, and the entire laser beam enters the fiber cross section and does not illuminate other highly absorbing materials such as the aforementioned optical adhesive or the metal of the SMA connector. By setting the distance between the focussing lens and the entrance to the optical carrier to the position Zo, the power density of the laser beam does not increase, reducing the risk of surface or bulk damage to the optical fiber 11.

Although the same optimum alignment position could be obtained based on a calculated focal length of the lens and by matching the laser beam size to the fiber diameter based on a geometrical analysis, in practice, the above described method is necessary because of the critical tolerances associated with the high power densities.

Furthermore, the above noted procedures for coupling to a fiber optic can be applied in like manner to a hollow waveguide, thus assuring that the power density incident on the walls of the hollow waveguide will not exceed a critical damage threshold.

In the above noted alignment procedure (i.e. steps 500–508), once aligned the power to the laser can be increased (e.g. above the damage threshold), thereby transmitting the laser signal at least along an entire length of the optical carrier, and the laser signal is emitted at an application. The application can be one of an atmospheric pressure matrix assisted laser desorption ionization (MALDI) system, an atmospheric pressure liquid assisted desorption and ionization (AP/LADI) system, and a lidar system.

Figure 7:
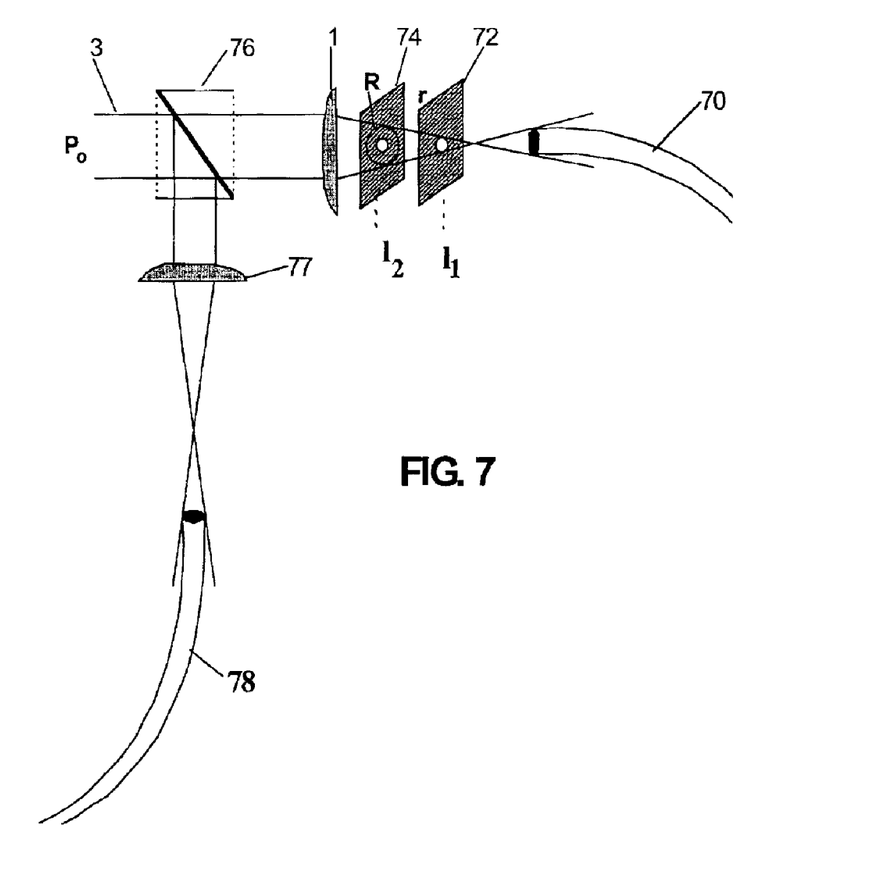
FIG. 7 is an exemplary schematic of an apparatus for dynamically altering a power density incident on a fiber optic or for splitting the laser signal using a beam splitter into a beam divergently coupled into a second optical fiber.

In step 502, the laser signal can be coupled to at least one optical fiber or a plurality of fibers by use of a beam splitter such as for example the beam splitter 76 shown in FIG. 7 through which laser signal can be split so as to be divergently coupled into separate optical fibers 70 or 78. One part of the laser signal is divergently coupled via a focussing lens 77 in to the optical fiber 78 while another part of the laser signal is divergently coupled into the optical fiber 70. As to be discussed later, the part of the laser signal divergently coupled into the optical fiber 70 can have the intensity of the laser signal varied independent of the laser power.

In step 502, a pulsed laser or an infrared laser can be used to couple the laser signal to the optical carrier, and an infrared-grade optical fiber (i.e. an optical fiber rated to transmit light in the regulated 2 $\mu$m and 7 $\mu$m ranges).

In step 506, an x-y-z stage can perform the translating to match an x-y-z position of the laser signal to the optical carrier.

In step 500, the power can be reduced utilizing the apparatus and methods described below.

Methods and Apparatus for Laser Power Attenuation

In many applications, such as in matrix assisted laser desorption ionization (MALDI) mass spectrometry, the optimum laser energy for operation depends on the target being irradiated with the laser beam. When a laser output power is fixed, a simple method for a large dynamic range of laser beam intensity reduction is often required.

While neutral density filters can potentially be used to reduce the power of the incident laser beam to acceptable levels, the output power density of the incident laser beam may, as with the optical carrier, exceed the damage threshold for the neutral density filter medium.

FIG. 7 shows an exemplary schematic of an apparatus for dynamically altering a power density incident on a fiber optic 70. In this approach, the laser beam intensity reduction can be accomplished, according to the present invention, by using a singular fixed-size aperture 72 located in front of a focusing lens 1 from which the laser beam 3 is converging or diverging. By varying the position of the singular fixed-size aperture, the power density incident on the fiber optic 70 is increased or decreased depending on the angle of light subtended by the diameter the aperture 72.

$$P_{l_1} = P_o$$

$$P_{l_2} = P_o \frac{r^2}{R^2}$$

In another approach of the present invention, laser beam intensity reduction can be accomplished by locating a pinhole aperture (of a diameter slightly larger than the diffraction-limited minimum beam size) at various distance from the focal point. A large dynamic range in power reduction can be achieved by varying the location of the pinhole aperture 80. The equation shown below shows that the power incident $Pl_1$ and $Pl_2$ on the fiber optic 70 varies as an area ratio of the pinhole aperture determined by the laser beam size at the position of the pinhole.

Alternatively, the optical fiber cross section itself can function as a pinhole aperture, and the coupling efficiency can be reduced by moving the fiber position away from the optimum coupling position. The same result can be obtained by using an adjustable aperture anywhere in the beam path.

Application Fields

In one field of application, the present invention can be applied to an atmospheric pressure MALDI system such as the system described in Laiko et al., "Atmospheric Pressure Matrix-Assisted Laser Desorption/Ionization Mass Spectrocopy", Anal. Chem., Feb. 15, 2000, vol. 72, no. 4, pp. 652–657, the entire contents of which are incorporated herein by reference. In another field of application, the present invention can be applied to atmospheric pressure Liquid Assisted Desorption and Ionization (AP/LADI) system for mass analysis of bio analyte, such as the system described in Laiko et al., "Desorption/Ionization of Biomolecules from Aqueous Solutions at Atmospheric Pressure Using an Infrared Laser at 3 $\mu$m", J. Am. Soc. Mass. Spectrom. 2002, vol. 13, pp 354–361, the entire contents of which are incorporated herein by reference. In yet another field of application, the present invention can be applied to a light detection and ranging (LIDAR) system, such as the system described in Prasaad et al., "Portable Digital Lidar- a Compact Stand-off BioAgent Aerosol Sensor," Proceedings of SPIE vol. 4378 (2001) pp. 50–59, the entire contents of which are incorporated herein by reference.

Figure 8:
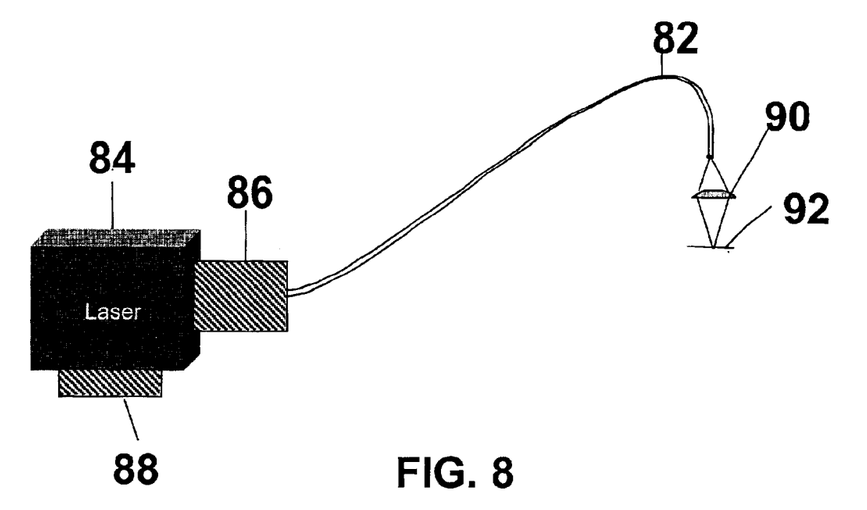
FIG. 8 is an exemplary diagram of a coupling, according to the present invention, of a high power laser to a remote system.

As shown in FIG. 8, an application such as MALDI, AP/LADI, or a LIDAR includes a flexible optical cable 82 functioning as the optical carrier and transmitting a laser signal from a laser source 84 to sample positions or a broadcast point of respective MALDI, AP/LADI, or LIDAR systems. An optical coupling device 86 including for example the focusing lens 1 or the combination lenses 6 and 7 couples the laser signal into flexible optical cable 82. A power-density control device 88 controls a power output of the laser signal to a power density level below a damage threshold of the material of the flexible optical cable 82. A position-setting device (not explicitly shown but contained schematically within the optical coupling device 86) includes a translation device (such as the x-y-z translation stage 44) configured to translate at least one of a focusing lens in the optical coupling device 86 or an entrance to the optical cable 82 along an optical axis between the focusing lens and the entrance to the optical cable 82. The position-setting device 90 is configured to set a distance between the focusing lens and the entrance to the optical cable 82 such that the entrance is at a position beyond a focal point of the focusing lens where the laser signal is divergent-coupled to the optical carrier. Once aligned, the power-density control device 88 adjusts the power of the laser source to a level sufficient for operation of the respective systems without exceeding the damage threshold of the optical carrier materials in the flexible optical cable 82.

An output of the optical cable 82 provides an incoherent scrambled laser intensity profile with a divergence angle governed by the numerical aperture of the optical cable 82. The fiber output can be considered as an incoherent diffuse source with an almost flat intensity distribution. This distribution can be refocused by a subsequent lens downstream from the optical cable 82 to a downstream focal spot or subsequently de-magnified with a higher numerical optics system, if desired, for example at an exit of the cable 82. The laser signal emerges and is focussed by an application lens 90 to a target 92. The target can be a sample positon including the matrix components for MALDI or the liquid constituents for AP/LADI. The target can be a broadcast point for emission of light in the LIDAR system.

In these applications, the short pulse laser energies applied are normally in the neighborhood of a few hundred microjoules to a few millijoules. Laser systems to produce such pulse energies are usually large and massive, encumbering interfacing between the laser system and the conventional optics utilized in the AP/MALDI system.

In the present invention, the flexible optical cable 82 delivers high power laser pulses to a matrix material placed on a sample plate in close vicinity of an inlet of a mass spectrometer for AP-MALDI, or delivers high power laser pulses to a liquid analyte solution placed on a sample plate in close vicinity of the inlet of the mass spectrometer for AP/LADI. By utilizing the flexible optical cable in conjunction the divergent-coupling method of the present invention, the present invention provides convenience and operational reliability to AP/MALDI and AP/LADI systems.

In LIDAR, like the above-noted AP/MALDI and AP/LADI systems, a pulse laser system is used. Conventionally, the LIDAR laser system is integrated with a transceiver system through a rigid transfer optics system to ensure proper alignment of the high power laser beam onto the output optics of the LIDAR system. The required laser pulse energy in LIDAR is near a millijoule or less with an extremely high pulse repetition rate up to a few tens of killoherz. In a conventional lidar system, the laser beam alignment requirement with respect to the transceiver system optical axis is usually within a few microradians, and the stability requirement is also a few microradians. Operation of a LIDAR system in the field often requires transportation of the system and consequently imposes vibration and shock on to the system causing misalignment. Furthermore, large temperature variations normally encountered in the open field environment require the utilization of a rigid mechanical structure. Design of a large and heavy mechanical structure has been the common approach used to cope with the alignment and stability requirements.

According to the present invention, the application of the divergent-coupling permits a laser system to be coupled via a fiber optic cable to a LIDAR transceiver and thereby achieving the mechanical stability and alignment of the high pulse laser beam to the transceiver utilizing a simple, reduced size and weight structure.

Numerous modifications and variations of the present invention are possible in light of the above teachings. It is therefore to be understood that within the scope of the appended claims, the invention may be practiced otherwise than as specifically described herein.

What is claimed is:

1. A method for coupling a laser signal to an optical carrier, comprising:
controlling a power of the laser signal such that a power density at a focal point is below a damage threshold of the optical carrier;
coupling the laser signal to the optical carrier;
measuring a coupled power of said laser signal;
translating at least one of a focusing lens and an entrance of the optical carrier along an optical axis between the focusing lens and the entrance to the optical carrier to determine a range in a measured power output in which the laser signal is incident within the entrance of the optical carrier; and
setting a distance between the focusing lens and the entrance to the optical carrier such that said entrance is at a position beyond a focal point of the focusing lens where the laser signal is divergent-coupled to into a body of the optical carrier.

2. The method of claim 1, further comprising:
increasing the power of the laser signal;
transmitting the laser signal along the optical carrier; and
emitting at least a portion of the laser signal at an application.

3. The method of claim 1, wherein said translating determines for said range a plateau in the measured power.

4. The method of claim 3, wherein the coupling comprises:
coupling said laser signal to at least one optical fiber located at a position on said plateau in the measured power beyond the focal point.

5. The method of claim 1, further comprising:
coupling via a beam splitter a first part of said laser signal to a first optical fiber located at a position on a plateau in the measured power beyond the focal point; and
coupling via said beam splitter a second part of said laser signal through a laser power attenuation device to a second optical fiber.

6. The method of claim 1, further comprising:
varying a coupling efficiency of said laser signal to the optical carrier by moving at least one of a position of the focussing lens and a position of said entrance of the optical carrier.

7. The method of claim 2, wherein the emitting comprises:
emitting said laser signal into at least one of an atmospheric pressure matrix assisted laser desorption ionization (MALDI) system, an atmospheric pressure liquid assisted desorption and ionization (AP/LADI) system, and a light detector and ranging (LIDAR) system.

8. The method of claim 1, wherein the coupling comprises:
coupling said laser signal to at least one optical fiber such that the laser signal is not incident on a periphery of said optical carrier.

9. The method of claim 1, wherein the coupling comprises:
focussing a pulsed laser beam as the laser signal.

10. The method of claim 1, wherein the translating comprises:
translating with an x-y-z stage to match an x-y-z position of the laser signal to the optical carrier.

11. The method of claim 1, wherein the coupling comprises:
transmitting through the focussing lens an infrared laser as the laser signal.

12. The method of claim 1, wherein the coupling comprises:
transmitting through the focussing lens the laser signal into an infrared-grade optical fiber.

13. The method of claim 1, wherein the coupling comprises:
transmitting through the focussing lens the laser signal into a hollow waveguide.

14. The method of claim 1, wherein the controlling comprises:
reducing the power density of the laser signal by inserting an aperture having a diameter approximate in size to a diffraction limited focal spot size of said laser signal between the focussing lens and a focal point of the focussing lens; and
translating the aperture along a laser beam axis of said laser signal.

15. The method of claim 1, wherein the controlling comprises:
translating the entrance of the optical carrier along said optical axis between the focusing lens and the entrance to the optical carrier and away from the focal point of the focussing lens.

16. The method of claim 15, wherein the translating the entrance of the optical carrier reduces an overlap efficiency between the laser beam cross section and the fiber cross section.

17. A laser signal coupling apparatus comprising:
an optical carrier configured to transmit a laser signal from a laser source to an application;
an optical coupling device including at least one focusing lens and configured to couple said laser signal to said optical carrier;
a power-density control device configured to control a power of the laser signal such that a power density at a focal point is below a damage threshold of the optical carrier; and
a position-setting device configured to translate at least one of the focusing lens and an entrance of the optical carrier along an optical axis between the focusing lens and the entrance to the optical carrier, and configured to set a distance between the focusing lens and said entrance to the optical carrier such that said entrance is at a position beyond a focal point of the focusing lens where the laser signal is divergent-coupled into a body of the optical carrier.

18. The apparatus of claim 17, wherein the position-setting device comprises:
a power meter configured to measure a coupled power of said laser signal in the optical carrier.

19. The apparatus of claim 18, wherein the position-setting device is configured to determine a range in a measured power output in which the laser signal is incident within the entrance to the optical carrier.

20. The apparatus of claim 19, wherein the position-setting device is configured to determine a plateau in the measured power.

21. The apparatus of claim 17, wherein the application comprises:
at least one of an atmospheric pressure matrix assisted laser desorption ionization (MALDI) system, an atmospheric pressure liquid assisted desorption and ionization (AP/LADI) system, and a lidar system.

22. The apparatus of claim 17, wherein the optical carrier comprises:
at least one optical fiber.

23. The apparatus of claim 22, further comprising:
a beam splitter configured to split said laser signal into a first part and a second part, said first part divergently coupled to a first optical fiber and said second part divergently coupled to a second optical fiber.

24. The apparatus of claim 17, wherein the optical carrier comprises an infrared-grade optical fiber.

25. The apparatus of claim 17, wherein the optical carrier comprises a hollow waveguide.

26. The apparatus of claim 17, wherein the optical coupling device is configured not to couple said laser signal onto a periphery of the optical carrier.

27. The apparatus of claim 17, wherein the laser source comprises a pulsed laser beam.

28. The apparatus of claim 17, wherein the laser source comprises an infrared laser.

29. The apparatus of claim 17, wherein the position-setting device comprises:
an x-y-z stage configured to match an x-y-z position of the laser signal to the optical carrier.

30. The apparatus of claim 17, wherein the power-density control device comprises:
an aperture having a diameter approximate in size to a diffraction limited focal spot size of said laser signal and inserted in front of the focusing lens.

31. An atmospheric pressure matrix assisted laser desorption ionization (MALDI) system comprising:
an optical carrier configured to transmit a laser signal from a laser source to a sample position;
a focusing lens configured to couple said laser signal to said optical carrier;
a power-density control device configured to control a power of the laser source to a power density level below a damage threshold of the optical carrier;
a position-setting device configured to translate at least one of the focusing lens and an entrance of the optical carrier along an optical axis between the focusing lens and an entrance to the optical carrier, and configured to set a distance between the focusing lens and the entrance to the optical carrier such that said entrance is at a position beyond a focal point of the focusing lens where the laser signal is divergent-coupled into a body of the optical carrier,
wherein said power-density control device adjusts the power of the laser source to a level for desorption ionization of matrix constituents at the sample position without exceeding the damage threshold of the optical carrier.

32. An atmospheric pressure liquid assisted desorption and ionization (AP/LADI) system comprising:
an optical carrier configured to transmit a laser signal from a laser source to a sample position;
a focusing lens configured to couple said laser signal to said optical carrier;
a power-density control device configured to control a power of the laser source to a power density level below a damage threshold of the optical carrier;
a position-setting device configured to translate at least one of the focusing lens and an entrance of the optical carrier along an optical axis between the focusing lens and an entrance to the optical carrier, and configured to set a distance between the focusing lens and the entrance to the optical carrier such that said entrance is at a position beyond a focal point of the focusing lens where the laser signal is divergent-coupled into a body ot the optical carrier.

wherein said power-density control device adjusts the power of the laser source to a level for desorption ionization of liquid constituents at the sample position without exceeding the damage threshold of the optical carrier.

33. A light detection and ranging (LIDAR) system comprising:
an optical carrier configured to transmit a laser signal from a laser source at a broadcast point;
a focusing lens configured to couple said laser signal to said optical carrier;
a power-density control device configured to control a power of the laser source to a power density level below a damage threshold of the optical carrier;
a position-setting device configured to translate at least one of the focusing lens and an entrance of the optical carrier along an optical axis between the focusing lens and an entrance to the optical carrier, and configured to set a distance between the focusing lens and the entrance to the optical carrier such that said entrance is at a position beyond a focal point of the focusing lens where the laser signal is divergent-coupled into a body of the optical carrier,
wherein said power-density control device adjusts the power of the laser source to a level for light detection and ranging at the broadcast point without exceeding the damage threshold of the optical carrier.

34. A method for controlling a power density of a laser, comprising:
focusing by a focusing lens placed on an optical path of the laser a laser beam of said laser onto an optical carrier;
translating an entrance of the optical carrier along an optical axis between the focusing lens and the entrance to the optical carrier and away from a focal point of the focusing lens to divergently couple said laser into a body of the optical carrier.

35. A method for coupling a laser signal to an optical carrier, comprising:
divergently coupling the laser signal into a body of the optical carrier such that a focal point of the laser signal is outside the optical carrier.

36. A laser signal coupling apparatus comprising:
an optical carrier configured to transmit a laser signal from a laser source;
an optical coupling device including a focusing lens and configured to divergently couple said laser signal into a body of said optical carrier by placing a focal point of the focusing lens outside the optical carrier.

37. The method of claim 1, wherein said coupling the laser signal to the optical carrier comprises:
coupling the laser signal into said optical carrier without use of an entrance focusing lens integral to the optical carrier.

38. The apparatus of claim 17, wherein said optical carrier does not include an entrance focusing lens integral to the optical carrier.

39. The method of claim 35, wherein said coupling the laser signal to the optical carrier comprises:
coupling the laser signal into said optical carrier without use of an entrance focusing lens integral to the optical carrier.

40. The apparatus of claim 36, wherein said optical carrier does not include an entrance focusing lens integral to the optical carrier.

* * * * *